(12) United States Patent
Parolini

(10) Patent No.: US 6,713,124 B2
(45) Date of Patent: Mar. 30, 2004

(54) METHOD OF MANUFACTURING RUBBER PLATES OR SHEETS

(75) Inventor: Giuseppe Parolini, Verona (IT)

(73) Assignee: Prialpas S.p.A. (IT)

( * ) Notice: Subject to any disclaimer, the term of this patent is extended or adjusted under 35 U.S.C. 154(b) by 0 days.

(21) Appl. No.: 10/109,758

(22) Filed: Mar. 29, 2002

(65) Prior Publication Data
US 2003/0185988 A1 Oct. 2, 2003

(51) Int. Cl.[7] .................................................. B05D 3/12
(52) U.S. Cl. ........................................ 427/155; 427/370
(58) Field of Search ................................ 427/154, 155, 427/370

(56) References Cited

U.S. PATENT DOCUMENTS

| | | | |
|---|---|---|---|
| 3,839,066 A | * | 10/1974 | Brenner ..................... 427/155 |
| 5,670,237 A | * | 9/1997 | Shultz et al. ................ 428/173 |
| 5,741,062 A | | 4/1998 | Man ............................ 362/208 |
| 5,891,564 A | | 4/1999 | Shultz et al. ................ 428/324 |

FOREIGN PATENT DOCUMENTS

| | | |
|---|---|---|
| DE | 2926983 | 1/1981 |
| DE | 19915868 | 10/2000 |
| FR | 2454899 | * 12/1980 |

* cited by examiner

Primary Examiner—Erma Cameron
(74) Attorney, Agent, or Firm—Orum & Roth

(57) ABSTRACT

A method of manufacturing a plate or parts thereof of coated rubber, suitable particularly but not exclusively for the soles of footwear, wherein a plate of rubber is coated with at least one colour toning additive and a plate thus coated.

18 Claims, 2 Drawing Sheets

METHOD OF MANUFACTURING RUBBER PLATES OR SHEETS

BACKGROUND OF THE INVENTION

The present invention relates to a method of manufacturing rubber plates or sheets, particularly but not exclusively suitable for obtaining soles of footwear, and to plates, or parts thereof, thus manufactured.

In the present description, the term 'rubber plate' is meant to indicate a flat product whether obtained from a moulding press piece by piece or in the form of a continuous sheet.

Coated rubber plates are currently manufactured and sold as flooring and/or facings and also as soles for footwear in general.

In order to be attractive to the public and for other commercial reasons, such plates have to be decorated and/or bear brand names or logos or be otherwise embellished. In the particular case of soles for footwear it is imperative to be able to impress some information, in the form of letters and numbers, on the sole, such as the shoe number, the trademark or the manufacturer's name or other distinguishing signs.

No doubt a well executed decoration may notably increase the value to the public of a sole and thus also the footwear to which it is applied. Thus, it is a matter of great importance to be able to produce rubber plates or soles that are either decorated or can be decorated at will.

Traditionally, the operation of decorating and branding a plate or sole or marking the shoe number is carried out by a bass-relief formed during moulding of the sheet or plate (given that hot branding cannot be satisfactorily performed on rubber) or with special inks or transfer films.

The soles obtained from rubber plates are subsequently subjected to various kinds of finishing operations including die-cutting, sewing, gluing, grinding, grooving and the like. In the case of plates having a 'velvet'-like coated surface, working on the plates or parts thereof, e.g. on soles obtained by die-cutting a rubber plate, is rather critical as the velvet surfaces are liable to become permanently dirty due to many possible causes, e.g. the presence of dust, oil, grease, trimming of the coating applied to the edges, contact with the operator's hands etc., and more importantly it is then no longer possible to properly clean them with the result that the soles are effectively and irretrievably ruined.

Thus, it has already been suggested to cover the velvet surface of rubber plates with a protective film of plastics material that have to be decorated after having undergone a die-cutting operation.

Such a protective film shields the sheets from dirt and possible damage but prevents the plate itself or the soles obtained from it from being decorated.

Recourse is sometimes taken to the expedient of creating windows at the plate or sole areas to be decorated but of course such an operation involves additional costs and does not in any case provide protection from dirt or possible damage in the exposed areas where the protective film has been removed.

SUMMARY OF THE INVENTION

The main object of the present invention is to provide a method that makes it possible to easily decorate or brand rubber plates or soles provided with a protective film or covering layer without risking their surfaces getting dirty or in any other way deteriorating.

Another object of the present invention is that of removing or substantially reducing any of the above described drawbacks by providing a method of manufacturing of coated rubber plates particularly suitable for the soles of footwear that makes it possible to easily impress information in the form of numbers and letters as well decorative features, trademarks or the like on the plate surface.

Not the least important object of the present invention is that of providing a new and effective method of manufacturing rubber plates or soles that involves low additional production costs, thereby being competitive even from the economical viewpoint.

These and other objects are, chleved by a moulding method of manufacturing a rubber plate, or part thereof, particularly suitable for footwear soles, according to the present Invention, comprising the following operational steps:

coating at least on of said face of said rubber plate with at least one coating material including at least one heat and pressure color toning component, applying onto each said coated face a film of transparent material that withstands heat and pressure required for causing each said color toning component to color tune, and applying at least one heat and pressure impression means onto said film protective material, thereby causing permanent toning of the or each toning component and formation of predetermined images in said coating material.

Advantageously, the said coating material is a velvet paint.

BRIEF DESCRIPTION OF THE DRAWINGS

Further aspects and advantages of the present invention can be better understood from the following description of some embodiments thereof given merely by way of non-limiting examples, with reference to the accompanying drawings, in which.

DESCRIPTION OF THE PREFERRED EMBODIMENTS

Figure 1:
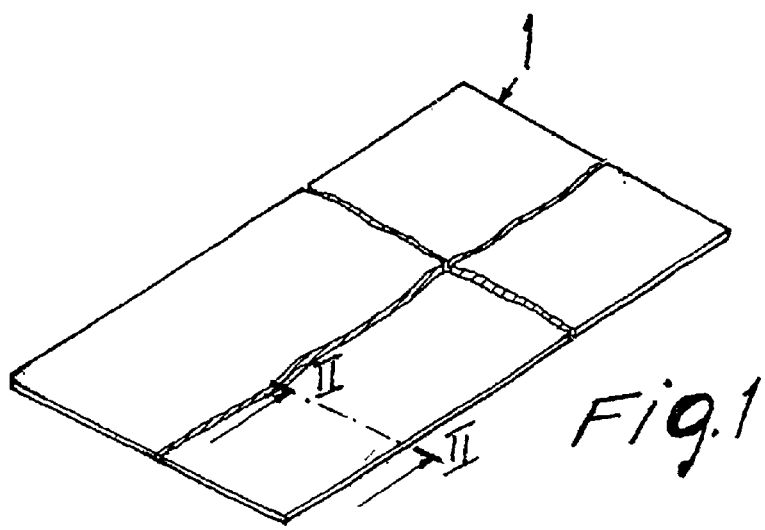
FIG. 1 shows a perspective view of a rubber plate or sheet in accordance with the present invention.
Figure 2:
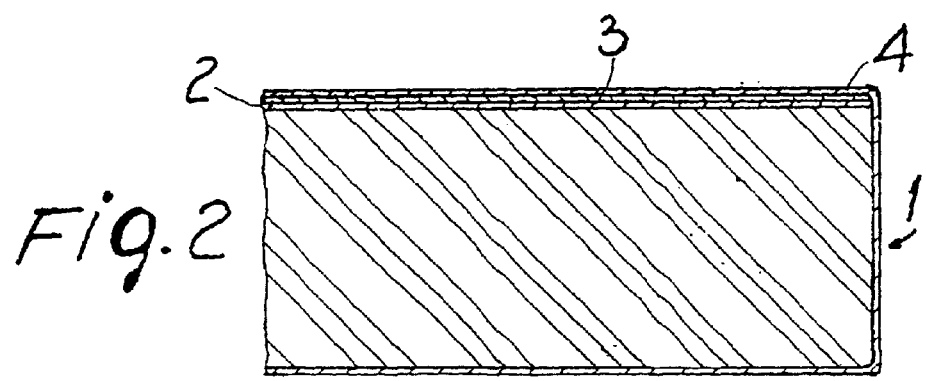
FIG. 2 is a cross-section view on an enlarged scale taken along the line II—II in FIG. 1.

Some specific and presently preferred ways of carrying out the method according to the invention are given below with reference to the accompanying drawings.

EXAMPLE 1

A vulcanised rubber plate 1 having a thickness of 5 mm was produced in a press according to a known curing process. A priming coating layer 2 made of a transparent IDROPOL 44016 paint produced by Polaris s.r.l. of Vicenza—Italy was applied to a face of rubber plate 1 by means of a roller or cylinder having an engraved surface.

The priming coating layer was dried and, again by making use of an engraved surface roller, a second coating layer 3 of coating paint was spread on the priming coating layer, which was obtained by mixing a product Px 64 sold by the Sic S.r.l. company of Milan—Italy—and a product Termosic also sold by the Sic s.r.l. (50% of Px 64 and 50% Termosic).

The product Px 64 includes a mix of resins that expand under the effect of a heat source, thereby producing a 'velvety' surface, whereas the Termosic product is heat-sensitive and becomes permanently expanded under determined conditions of temperature and pressure.

In order to obtain a velvet effect, the temperature of the second coating layer was raised to 100° C. to cause the expandable resins contained in the product permanently to expand.

Once the second coating layer was dried, an 80 micron thick protective self-adhesive transparent polythene film 4 was applied on it in order to prevent the rubber plate from getting dirty during the various successive operating steps of the working process of the rubber plate and subsequently of the soles cut out therefrom.

Hot printing roller 6 embossed with the desired information or decoration was caused to roll on the coated surface protected by polythene film 4.

Time, pressure and temperature conditions are shown in the following table:

| Protective Film type | Roller temperature | Roller pressure | Contact time |
| --- | --- | --- | --- |
| Polythene | 120° C. | 6 bar | 20 seconds |

A problem that emerged during the test was the determination of the maximum temperature of the roller for contact with the polythene film that should not be damaged. Such a temperature was limited to 120° C. This determined, as a consequence, a relatively long contact time between roller 6 and protective film 4 for a complete tone colouring process to take place.

EXAMPLE 2

A vulcanised rubber plate 1 having a thickness of 4 mm was used (FIG. 1), onto which a first coating layer 2 of a product commercially available as Black Idropol 44004 manufactured by Polaris s.r.l was sprayed. The coating layer 2 was provided in order to determine the colour of the stamp or decoration as obtained at the end of the process of permanent colour toning.

Once the coating layer 2 was dry, a second coating 3 was spread onto it by an engraved surface roller. Coating layer 2 was obtained by mixing product Px 64 sold by Sic s.r.l. and Arz 139 sold by Stahl Italia S.p.A. of Vicenza—Italy—plus any pigment and/or colorant (the proportion used including 50% of Px 64 and 50% Arz 139).

Also in this case the product Px 64 has the function of producing a velvety surface, whereas one of the components of Arz 139 is a heat sensitive material.

Once the second coating layer 3 was dry, a 35 micron thick protective self-adhesive polythene film 4 was stuck to its surface to prevent the plate 1 from getting damaged in any way.

Figure 3:
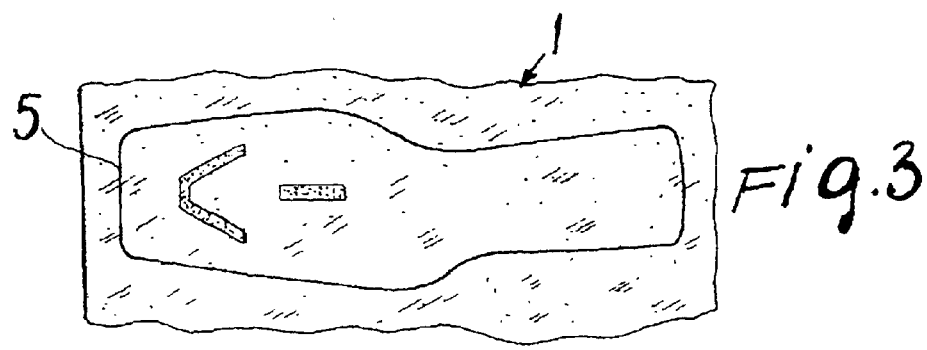
FIG. 3 is a front elevation view of a portion of a rubber plate obtained in accordance with the present invention ready for a die-cutting process for cutting out a sole.
Figure 4:
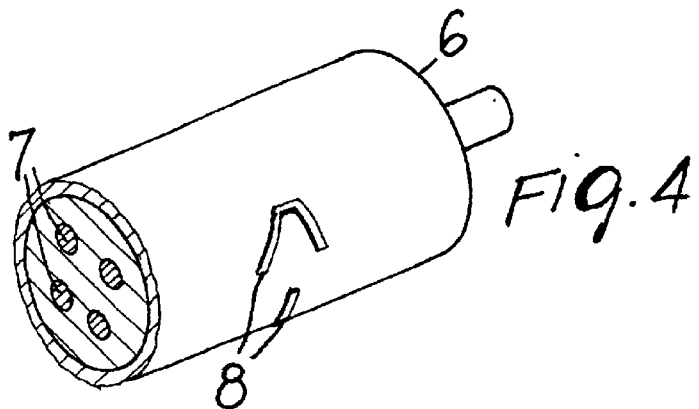
FIG. 4 illustrates a perspective and partly cross-section view of a heat printing roller.
Figure 5:
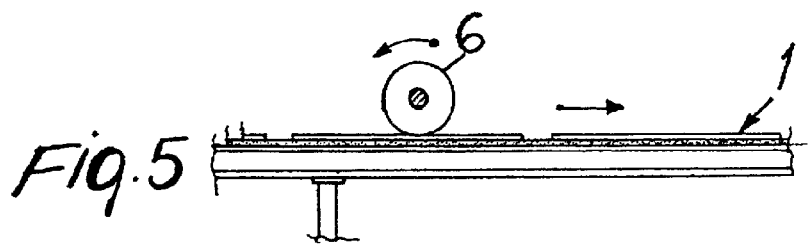
FIG. 5 is an side elevation view of a printing stage of a rubber sole by means of the printing roller of FIG. 4.
Figure 6:
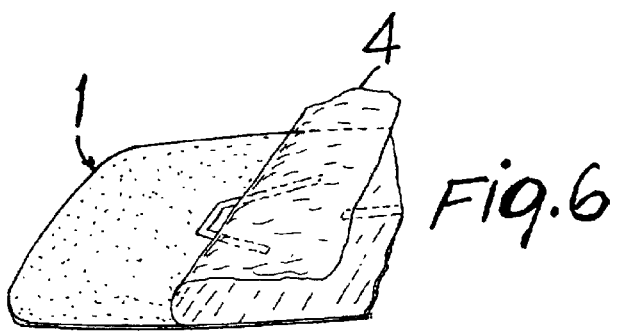
FIG. 6 is a perspective view of a portion of a rubber sole printed according to the present invention and protected by a transparent film.
Figure 7:
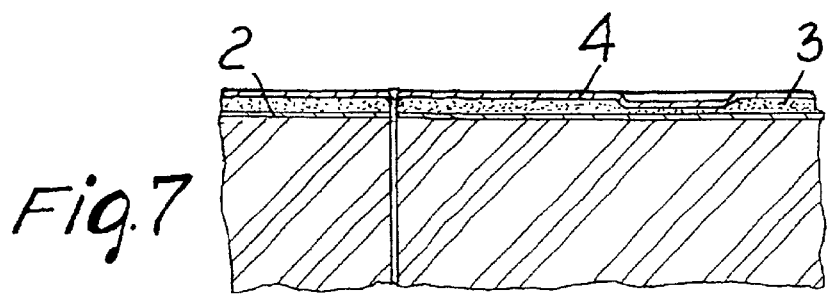
FIG. 7 is a cross-sectional view on an enlarged scale taken along the line VII—VII in FIG. 3.

The plate 1 thus obtained was die-cut to obtain a shoe sole 5 as shown in FIG. 3. A hot roller die 6 having electric heating resistors 7 inside thereof and areas 8 in relief on its external cylindrical surface, as shown in FIGS. 4 and 5, was caused to roll on the protective film 4 covering the coating layers 2 and 3 of the sole 5 while exerting a relatively light pressure thereon to cause a change of colour at those areas under the areas 8 in relief of the roller 6, thereby reproducing an image of the same relief areas in the coating layers of the sole 5 using the parameters indicated in the following table:

| Protective Film type | Roller temperature | Roller pressure | Contact time |
| --- | --- | --- | --- |
| Polyester | 200° C. | 6 bar | 1 second |

EXAMPLE 3

The same operating conditions as those described in Example 2 were adopted and protective film 4 of polyester was replaced by a film of heat resistant paper (oven paper) having a thickness of 35 microns.

Time, pressure and temperature conditions between roller 6 and protective film 4 were those shown in the following table:

| Protective Film type | Roller temperature | Roller pressure | Contact time |
| --- | --- | --- | --- |
| Heat resistant paper | 200° C. | 6 bar | 2 seconds |

While using heat resistant paper (oven paper), particular care was taken as regards the mould or roller temperature and contact time to avoid formation of gluing products.

Moreover, the outcome of the colour toning could not be visually checked as the oven paper is not transparent, thus preventing the impressed image from being seen.

EXAMPLE 4

The same operating conditions as those described in Example 1 were adopted except that but a single coating layer 3 was applied directly to a vulcanised rubber plate, this coating layer being obtained by mixing product Px 64 sold by Sic s.r.l. and product Termosic also sold by Sic s.r.l.

In this case, a darker printed colour tone was obtained since the colour underlying the coating layer 3 affected the colour of the print, which was considered advantageous for the aesthetics of the sole 5.

EXAMPLE 5

The same operating conditions as those described in Example 1 or 2 were adopted, while replacing the protective film 4 of polythene with a layer of polypropylene having a thickness of 30 microns. Such a choice caused some problems with the finished product due to the difficulty in getting the polypropylene film to adhere by using most common glues.

Time, pressure and temperature conditions between roller and protective film were those shown in the following table:

| Protective Film type | Roller temperature | Roller pressure | Contact time |
|---|---|---|---|
| Polypropylene | 180° C. | 6 bar | 2 seconds |

EXAMPLE 6

The same conditions as those described in Example 6 were adopted while replacing the PVC film with a multi-layered film of polythene and polypropylene, the polythene layer being self-adhesive. This choice was dictated in that polythene turned out to be more easily usable with most common glues, whereas polypropylene had a greater heat resistance and thus a shorter sheet decorating time was required.

Time, pressure and temperature conditions between roller and protective film were those shown in the following table:

| Protective Film type | Roller temperature | Roller pressure | Contact time |
|---|---|---|---|
| Polythene/ Polypropylene | 200° C. | 6 bar | 1 second |

EXAMPLE 7

The same conditions as those described in Example 1 were adopted, except that this time 66% of Px 64 and 33% of Termosic were mixed together to obtain a coating product that was applied as layer 3.

This choice made it possible to obtain a more velvety surface but a lighter colouring, as product Px 64 is transparent.

In carrying out the procedure in accordance with this invention, the choice of protective film 4 must of course take into consideration the activation temperature of the toning agents (and thus the roller temperature). As a matter of fact, the protective film must not deteriorate or develop noxious substances when in contact with the hot stamp or roller.

If a glossy coated plate is used, which has a greater resistance to dirt, or if a lower quality product is to be obtained, the use of a protective film 4 can be omitted.

Of course, the die cutting operation can be carried out after the imaging or toning stage as the protective film 4 can be kept in contact with the rubber plate 1 until the final product (i.e. a footwear) has been sold to the actual consumer.

It is also possible to provide a priming layer of coloured paint, whose colour is designed to determine by contrast the hue of the images obtained by colour toning the paint layer or layers containing one or more toning additives.

To this end, experiments were conducted as specified in the following Example 8.

EXAMPLE 8

Use was made of a vulcanised rubber plate 1 having a thickness of 4 mm. A priming coating layer 2 of a paint obtained by mixing together 70% of a transparent product Idropol 44014 sold by Polaris s.r.l. of Vicenza—Italy—and 30% of "Rosso Vivace" product sold by Sic s.r.l of Milan—Italy—was applied onto a surface of the rubber plate 1 by means of an embossed spreading roller.

The paint was dried and a second coating layer 3 of a paint obtained by mixing together a product ARZ-139 sold by Stahl Italia S.p.A. of Vicenza—Italy—and a product LD-5928 Giallo also sold by Stahl Italia S.p.A. was applied by means of an embossed roller. Different results were achieved depending upon the mixing ratio, i.e.

| a) ARZ-139 | 99.5% | LD-5928 Giallo | 0.5% |
|---|---|---|---| final result: slight final colouring tending to yellow; after heat and pressure toning formation of complete red colour background was obtained.

| b) ARZ-139 | 97% | LD-5928 Giallo | 3% |
|---|---|---|---| final result: final colouring tending to yellow slightly more intense with respect to test a); after heat and pressure toning formation of red colour background with a slight yellow shading was obtained.

| c) ARZ-139 | 90% | LD-5928 Giallo | 10% |
|---|---|---|---| final result: final colouring tending to a more intense yellow with respect to the test b); after heat and pressure toning formation of red background with yellow shading was observed.

| d) ARZ-139 | 85% | LD-5928 Giallo | 15% |
|---|---|---|---| final result: final intense yellow colouring; after heat and pressure toning formation of red background with a strong yellow shading was observed.

In view of the above, the invention does provide an effective and reliable method of decorating and/or branding coated rubber sheets or parts thereof through a protective film.

The protective film 4 is advantageously caused to adhere to the coating paint by means of a glue or by using a self-adhesive protective film.

The rubber plates, or parts thereof, coated with one or more coating layers 2 and 3 and protected by a protective film 4 are ready for receiving any suitable decorative and/or marking work carried out on them in accordance with the method according to the present invention.

What is claimed is:

1. A moulding method of manufacturing a rubber plate, or part thereof, comprising the following operation steps:
   coating at least one face of said rubber plate with at least one coating material including at least one heat and pressure colour toning component,
   applying onto each said coated face a film of protective materiel that withstands heat and pressure, and
   applying at least one heat and pressure impression means onto said film of protective material thereby causing permanent toning of the or each said toning component and formation of predetermined images in said coating material.

2. A method as claimed in claim 1, wherein the said at least one coating material is a velvety paint.

3. A method as claimed in claim 1, wherein the said film of protective material is transparent.

4. A moulding method of manufacturing a rubber plate, comprising the steps of:

coating at least one face of said rubber plate with at least one coating material including at least one heat and pressure colour toning component, applying onto each said coated face a film of protective material that withstands heat and pressure required for causing each said colour toning component to colour tune; and applying at least one heat and pressure impression means onto said film of protective material thereby causing permanent toning of the or each toning component and the formation of predetermined images in said coating material.

5. A method as claimed in claim 4, wherein the said application of said at least one impression means onto said protective film takes place at a pressure ranging between about 1 and 15 bar and at a temperature ranging, respectively, between about 250° and 50° C.

6. A method as claimed in claim 4, wherein before coating the surface of said rubber plate said rubber plate is provided with a priming coat of coloured paint designed to determine the colour hue at said image obtained by colour toning of the or each coating including a toning additive.

7. A method as claimed in claim 4, comprising die-cutting the said rubber plate either before or after said application of the said impression means, thereby obtaining one or more objects having a desired outline.

8. A moulding method of a manufacturing a rubber plate, comprising the steps of:

coating at least one face of said rubber plate with at least one coating material including at least one heat and pressure colour toning component, applying onto each said coated face a film of protective material that withstands heat and pressure required for causing each said colour toning component to colour tuner; wherein the said protective film is removably applied to said at least one coating layer.

9. A method as claimed in claim 8, wherein said protective film is a self-adhesive film.

10. A method as claimed in claim 8, wherein said protective film comprises a polyester film.

11. A method as claimed in claim 9, wherein said protective polyester film has a thickness ranging between about 10 and 200 micron.

12. A method as claimed in claim 8, wherein said protective film comprises a PVC (polyvinyl chloride) film.

13. A method as claimed in claim 8, wherein said protective film comprises a polypropylene film.

14. A method as claimed in claim 8, wherein said protective film comprises a transparent paper.

15. A method as claimed in claim 14, wherein said paper film has a thickness ranging between about 10 and 200 micron.

16. A method as claimed in claim 7, wherein said protective film comprises two films joined together selected from the group consisting of polythene, polyester, PVC, polypropylene and transparent paper.

17. A method as claimed in claim 2, wherein said film of protective material is transparent.

18. A moulding method of a manufacturing a rubber plate, comprising the steps of:

coating at least one face of said rubber plate with at least one coating material including at least one heat and pressure colour toning component, applying onto each said coated face a film of protective material that withstands heat and pressure required for causing each said colour toning component to colour tune; and applying at least one heat and pressure impression means onto said film of protective materiel thereby causing permanent toning of the or each toning component and formation of predetermined images in said coating material; and applying wherein the at least one coating material is a velvety paint.

* * * * *